United States Patent [19]

Mitschke et al.

[11] 4,370,254

[45] Jan. 25, 1983

[54] USE OF PERFLUOROALKANE SULPHONAMIDE SALTS AS SURFACE ACTIVE AGENTS

[75] Inventors: Karl-Heinz Mitschke, Odenthal; Hans Niederprüm, Monheim, both of Fed. Rep. of Germany

[73] Assignee: Bayer Aktiengesellschaft, Leverkusen, Fed. Rep. of Germany

[21] Appl. No.: 148,893

[22] Filed: May 12, 1980

[30] Foreign Application Priority Data

May 25, 1979 [DE] Fed. Rep. of Germany ...... 2921142

[51] Int. Cl.$^3$ .............................................. B01F 17/26
[52] U.S. Cl. .................................................... 252/355
[58] Field of Search ........................................ 252/355

[56] References Cited

U.S. PATENT DOCUMENTS

| | | | |
|---|---|---|---|
| 2,658,916 | 11/1953 | Krems | 252/355 |
| 2,732,398 | 1/1956 | Brice et al. | 252/71 |
| 2,915,554 | 12/1959 | Ahlbrecht et al. | 252/355 |
| 4,089,804 | 5/1978 | Falk | |

FOREIGN PATENT DOCUMENTS

| | | | |
|---|---|---|---|
| 1275054 | 8/1968 | Fed. Rep. of Germany | 252/355 |
| 1596922 | 6/1970 | France | 252/355 |

OTHER PUBLICATIONS

Hackh's Chemical Dictionary, 4th Ed., McGraw-Hill Book Company, New York, 1969, p. 650.

Chemiker Zeitung Nr. 2/80, p. 3.

*Primary Examiner*—Henry R. Jiles
*Assistant Examiner*—Robert C. Whittenbaugh
*Attorney, Agent, or Firm*—Sprung, Horn, Kramer & Woods

[57] ABSTRACT

Employing as surface active agents salts of perfluoroalkane sulphonamides, preferably of the formula

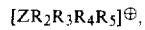

$$R_fSO_2N^{\ominus}M^{\oplus}$$
$$|$$
$$R$$

in which $R_F$ is a perfluorinated aliphatic group having 4 to 20 C-atoms,

R is a hydrogen atoms, an alkyl group having 1 to 4 C-atoms, a hydroxyalkyl group having 1 to 4 C-atoms or a cycloalkyl group having up to 6 C-atoms, and M is an alkali metal, an alkaline earth metal or an onium group of the formula $$[ZR_2R_3R_4R_5]^{\oplus},$$

Z is phosphorus or nitrogen, and $R_2$ to $R_5$ each independently is a hydrogen atom, or an alkyl, hydroxyalkyl, or alkoxyalkyl group having 1 to 4 C-atoms per alkyl moiety.

5 Claims, No Drawings

USE OF PERFLUOROALKANE SULPHONAMIDE SALTS AS SURFACE ACTIVE AGENTS

This invention relates to the use of perfluoroalkane sulphonamides and perfluoroalkane sulphonamide salts as surface active agents.

The alkali metal salts of perfluoroalkane sulphonamides are known compounds and have hitherto been used for the preparation of relatively complicated surface active substances (see e.g. U.S. Pat. Nos. 2,803,656; 2,803,615 and 2,809,990 and German Pat. No. 1,140,188).

It has now been found that the salts of perfluoroalkane sulphonamides, in particular those of unsubstituted perfluoroalkane sulphonamides, constitute excellent surface active agents in solution. Even at very low concentrations, about 0.2 g/l, they reduce the surface tension of water, to less than 20 dyn/cm. The same effect is obtained with the amides themselves in strongly alkaline medium.

The present invention therefore relates to the use as surface active agents of perfluoroalkane sulphonamide salts corresponding to the general formula:

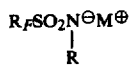

wherein $R_F$ represents a perfluorinated aliphatic group having 4 to 20 C-atoms, R represents a hydrogen atom, an alkyl group having 1 to 4 C-atoms, a hydroxyalkyl group having 1 to 4 C-atoms or a cycloalkyl group having up to 6 C-atoms and M represents an alkali metal, an alkaline earth metal or an onium group of the general formula

wherein Z represents phosphorus or nitrogen and $R_2$ to $R_5$ represent independently of each other, a hydrogen atom, or an alkyl, hydroxyalkyl or alkoxyalkyl group having 1 to 4 C-atoms.

It was surprisingly found that such compounds are highly effective surface active agents at least equal to if not superior in their effect to the known surface active agents which in most cases have a very complicated structure.

The following compounds are particularly preferred:
$C_4F_9SO_2NH_2.NH_3$;
$C_4F_9SO_2NHNa$;
$C_8F_{17}SO_2NH_2.NH_3$;
$C_8F_{17}SO_2NH_2.N(C_2H_5)_3$;
$C_8F_{17}SO_2N(CH_3)H.NH_3$;
$C_8F_{17}SO_2N(CH_3)H.N(C_2H_5)_3$;
$C_8F_{17}SO_2NH_2.N(CH_3)_3$;
$C_8F_{17}SO_2NH_2.NCH_3(CH_2CH_2OH)_2$;
$C_8F_{17}SO_2NHCH_3.N(CH_3)_3$;
$C_8F_{17}SO_2NHNa$;
$C_8F_{17}SO_2NHK$;
$C_{10}F_{21}SO_2NH_2.N(C_2H_5)_3$;
$C_{12}F_{25}SO_2NH_2.NH_3$;
$C_8F_{17}SO_2NH.N(CH_3)_4$.

The best results are obtained with compounds starting from the $C_8$ series.

The compounds to be used according to the invention may be obtained quite simply by the reaction of perfluoroalkane sulphonamides with bases in the presence of solvents.

According to a general method of preparation, approximately equimolar quantities of sulphonamide and base are stirred together in a calculated quantity of solvent or of a mixture of solvents at a temperature of about 20° C. to 70° C. The solution obtained, which thus has a known content of surface active agent, is suitable for use.

If the end products are insoluble in the particular solvents used, they may be isolated, e.g. by filtration, but there are advantages in using solutions. Firstly, since the surface active agent is already dissolved, it need only be diluted if necessary, and secondly, solutions are easier to measure out than a solid or a highly viscous oil, particularly when used in a continuous process.

In an alkaline medium, the free amides may be used instead of the sulphonamide salt solutions, but this variation does not afford any significant advantage since the free amide dissolves only slowly and the salt which acts as surface active agent must be formed from it, with the result that the maximum concentration of surface active agent is obtained only after a considerable time.

The solvents used may be water and/or organic water-soluble solvents, for example, alcohols, acetonitrile, dimethylformamide, dimethylsulphoxide, dioxane, tetrahydrofuran or acetone. When mixtures of such solvents are used, it is most suitable first to dissolve the sulphonamide in the organic solvent, then to add the calculated quantity of base and adjust to the required concentration by the addition of water.

The bases used may be alkali metal hydroxides and in particular basic nitrogen compounds, for example, ammonia or primary, secondary and/or tertiary amines. The following are some specific examples: Trimethylamine, triethylamine, tripropylamine, diethylamine, allylamide, propylamine, butylamine and alkanolamines, for example, diisopropanolamine or methyl-diethanolamine.

Any compounds containing amino groups could in principle be used.

The perfluoroalkanesulphonamides used as starting materials are prepared by known methods of reacting perfluoroalkane sulphonyl fluorides with ammonia or primary amines. The following are examples:
$C_4F_9SO_2NH_2$, $C_8F_{17}SO_2NH_2$, $C_4F_9SO_2NHCH_3$, $C_8F_{17}SO_2NHCH_3$, $C_{10}F_{21}SO_2NH_2$ and $C_{12}F_{25}SO_2NH_2$.

The surface active agents to be used according to the invention are suitable, by virtue of their properties, for the following purposes, in which they improve wetting, penetration, emulsification, dispersion, levelling, smoothness of flow and flow properties in general, stability of foams, etc.:

As emulsifiers for polymerization, in particular of fluoromonomers;

in admixture with surface active hydrocarbon compounds for wetting low energy surfaces including natural and synthetic rubbers, resins and plastics;

as mold release agents for silicones and the like;

as wetting agents for oil drilling treatments and drilling sludges;

as dirt solvents and dirt repellents;

as wetting agents for improving covering and penetration of substrate pores;

as wetting agents for the uniformity of dressings applied to finished yarns;

as emulsifiers/lubricants for fiber dressings;

as additives in fabric finishes for improving flow and uniformity;

as wetting agents for dyeing;

as additives to finishes and paints to improve equalization or levelling and prevent surface craters;

as levelling agents for floor waxes;

as foam-forming substances for use in dyes and printing inks;

for improving the properties and penetration of antimicrobial agents;

as wetting agents for herbicides, fungicides, weedkillers, hormonal growth regulators, parasiticides, insecticides, germicides, bactericides, nematocides, microbicides, descaling agents and fertilizers;

as wetting agents in formulations for cleaning agents, and as additives in alkaline cleaning agents.

As auxiliaries in photographic processing or the manufacture of films, e.g. for preventing reticulation in gelatine layers and improving the uniformity; as auxiliaries for drying films;

for the improvement of film coatings and reduction of "contraction patches";

as auxiliaries for wetting, levelling and prevention of crater formation;

as surface active agents for developer solutions; as photoemulsion stabilizers;

as agents to prevent caking of photolubricants and as coating auxiliaries in the manufacture of multilayered film elements;

as antistatic wetting agents used in the casting of films; as means for preventing thickened edges and as anti-fogging agents for films.

The preparation of the perfluoroalkane sulphonamide salts and their use according to the invention will be further illustrated with the aid of the following examples.

EXAMPLE 1

50 g (0.1 mol) of perfluorooctane sulphonamide and 10 g (0.1 mol) of triethylamine were introduced into 540 g of water with heating and the resulting mixture was stirred until a clear solution had formed. A 10% aqueous solution of $C_8F_{17}SO_2NH_2.N(C_2H_5)_3$ was obtained. When used in water at a concentration of only 150 mg per liter the substance reduced the surface tension to about 16.8 dyn/cm.

The solution may be further diluted for use.

EXAMPLE 2

499.1 g (1 mol) of perfluorooctane sulphonamide were dissolved in 600 g of ethanol in a stirrer vessel and 101.2 g (1 mol) of triethylamine were added. The clear solution was then mixed with 4802 g of water with heating. A 10% aqueous-alcoholic solution of the compound of Example 1 was obtained.

EXAMPLE 3

46.5 g (0.09 mol) of perfluorooctane sulphonamide were suspended in 448 g of water in a stirrer vessel. 5.2 g (0.09 mol) of potassium hydroxide were added at about 50° C. and the mixture was stirred until a completely homogeneous solution had formed. A 10% aqueous solution of $C_8F_{17}SO_2NH^\ominus \ K^\oplus$ was obtained. This may be diluted before use.

EXAMPLE 4

20.2 g (0.04 mol) of perfluorooctane sulphonamide were suspended in 225 g of water at about 50° C. 4.8 g (0.04 mol) of N-methyl-diethanolamine were added and the mixture was stirred until it formed a clear solution. A 10% aqueous solution of $C_8F_{17}SO_2NH^\ominus \ ^\oplus NHCH_3(CH_2CH_2OH)_2$ was obtained.

EXAMPLE 5

249.6 g (0.5 mol) of perfluorooctane sulphonamide were dissolved in 500 ml of ether with stirring and saturated with gaseous ammonia at room temperature. The precipitate which formed was filtered off and dried. 251 g (97% of the theoretical amount) of the compound $C_8F_{17}SO_2NH^\ominus \ ^\oplus NH_4$ (mp 151°–153° C.) were obtained.

25 g of this compound were dissolved in 225 g of heated water. A 10% aqueous solution, which may be further diluted, was obtained. When used at a concentration of 250 mg of substance per liter of water, it was found to lower the surface tension to 17.4 dyn/cm.

EXAMPLE 6

6.3 g (0.063 mol) of triethylamine were introduced into a suspension of 225 g of water and 18.7 g (0.063 mol) of perfluorobutane sulphonamide and the mixture was stirred at about 50° C. until a clear, 10% aqueous solution of $C_4F_9SO_2NH^\ominus \ ^\oplus NH(C_2H_5)_3$ was obtained.

EXAMPLE 7

49.9 g (0.1 mol) of perfluorooctane sulphonamide were dissolved in 100 ml of methanol and reacted with 5.6 g (0.1 mol) of potassium hydroxide at about 50° C. The solvent was then evaporated off under vacuum and $C_8F_{17}SO_2NH^\ominus \ K^\oplus$ were obtained as dry reaction product.

13.4 g (0.025 mol) of this compound were reacted with 4.1 g (0.025 mol) of tetraethylammonium chloride in 100 ml of isopropanol with stirring at about 60° C. After cooling of the reaction mixture, the potassium chloride which precipitated was filtered off and the filtrate was concentrated by evaporation. The compound of the formula $C_8F_{17}SO_2NH^\ominus \ ^\oplus N(C_2H_5)_4$ was obtained in a quantitative yield. It was found to be readily soluble in water and to have a powerful surface active action.

EXAMPLE 8

46.5 g (0.091 mol) of N-methyl-perfluorooctane sulphonamide and 5 g (0.09 mol) of potassium hydroxide were introduced into 448 g of water and dissolved at about 50° C. with stirring. A 10% aqueous solution of $C_8F_{17}SO_2N^\ominus CH_3K^\oplus$ was obtained. This solution became cloudy when diluted with water but clarified on the addition of alkali.

EXAMPLE 9

5.4 g (0.01 mol) of N-(2-hydroxyethyl)-perfluorooctane sulphonamide were dissolved in 25 ml of methanol. 1 g (0.01 mol) of triethylamine was added. The solvent was then evaporated off under vacuum. 6.4 g (quantitative yield) of the compound of formula $C_8F_{17}SO_2N^\ominus CH_2CH_2OH^\oplus NH(C_2H_5)_3$ were obtained.

EXAMPLE 10

3.84 g (0.096 mol) of sodium hydroxide were introduced into a suspension of 448 g of water and 47.9 g (0.096 mol) of perfluorooctane sulphonamide and the mixture was stirred at about 50° C. until a clear 10% aqueous solution of $C_8F_{17}SO_2NHNa$ was obtained.

EXAMPLE 11

49.4 g (0.099 mol) of perfluorooctane sulphonamide and 2.37 g (0.099 mol) of lithium hydroxide were introduced into 448 g of water and dissolved at ca. about 50° C. with stirring. A 10% solution of $C_8F_{17}SO_2NHLi$ was obtained.

EXAMPLE 12

39.47 g (0.079 mol) of perfluorooctane sulphonamide were suspended in 450 g of water at about 50° C. 10.53 g (0.079 mol) of diisopropanolamine were added and the mixture was stirred until a clear solution had formed. A 10% aqueous solution of $C_8F_{17}SO_2NH_2 \cdot NH[CH_2-CH(CH_3)OH]_2$ was obtained.

EXAMPLE 13

96.3 g (0.193 mol) of perfluorooctane sulphonamide and 7.15 g (0.097 mol) of calcium hydroxide were suspended in 896.5 g of water and stirred at about 60° C. until a 10% solution of $(C_8F_{17}SO_2NH)_2Ca$ was obtained.

A very good surface active effect could be obtained with all solutions prepared according to Examples 8 to 13.

The superiority of the salts in accordance with the invention is shown in the following illustrative example:

EXAMPLE 14

The wetting agents added in an aqueous solution were arranged opposite each other at a wetting machine of the type usual in the photographic industry.

The wetting machine comprises an unwinding device which contains the material to be wetted in the form of a web of a length of up to 300 m. The web is led over rolls to the wetting device, where one or more layers are poured over it. Then it is fed over rolls to a dryer and when dry is wound up.

As the web-like material is wetted, a thickening of the poured layer—a so-called bead—develops along the edges, in other words, the wet layer there has an increased thickness. The presence of such bead requires added dryer capacity, rendering it desirable to employ wetting agents which minimize bead formation so that the rate of travel of the web can be increased.

(a) Use of the conventional wetting agent tetraethyl ammonium perfluorooctanesulfonate:
Substrate: PE 310 with emulsion film
Wetting speed: 60 m/min.
Aqueous solution: $=1$ mPas (cP)
Wetting agent: $=27.2(mN)/(m)$, 15 ml/l 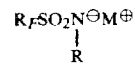
Width wetted: 120 mm
Wetting machine: Cascade wetter Result: Thick bead along the edges to that the rate of web travel has to be reduced as otherwise the material being wound sticks along the edges and in further processing will tear or exhibit other disadvantages.

(b) Use of the wetting agent according to Example 1: $=16.5(mN/m)$, 15 ml/l

Result: Bead formation substantially reduced, the rate of web travel can therefore be increased without sticking of the edges.

It will be appreciated that the instant specification and examples are set forth by way of illustration and not limitation, and that various modifications and changes may be made without departing from the spirit of the present invention.

What is claimed is:

1. In the lowering of the surface tension of an aqueous solution by adding thereto a surface active agent, the improvement which comprises employing as the surface active agent a salt of a perfluoroalkane sulphonamide.

2. The process according to claim 1, wherein the salt is of the formula $$R_FSO_2N^{\ominus}M^{\oplus}$$
$$|$$
$$R$$

in which
$R_F$ is a perfluorinated aliphatic group having 4 to 20 C-atoms,
R is a hydrogen atom, an alkyl group having 1 to 4 C-atoms, a hydroxyalkyl group having 1 to 4 C-atoms or a cycloalkyl group having up to 6 C-atoms, and
M is an alkali metal, an alkaline earth metal or an onium group of the formula $$[ZR_2R_3R_4R_5]^{\oplus},$$

Z is phosphorus or nitrogen, and
$R_2$ to $R_5$ each independently is a hydrogen atom, or an alkyl, hydroxyalkyl, or alkoxyalkyl group having 1 to 4 C-atoms per alkyl moiety.

3. The process according to claim 2, in which $R_F$ is an alkyl group having 8 to 20 C-atoms.

4. The process according to claim 2, in which
M is an onium group, and
Z is nitrogen.

5. The process according to claim 4, in which
R is an alkyl group having 1 to 4 C-atoms, a hydroxyalkyl group having 1 to 4 C-atoms or a cycloalkyl group having up to 6 C-atoms.

* * * * *